Aug. 22, 1967  J. W. COLTON  3,337,422
SOLVENT RECOVERY FROM POLYMERIC SOLUTION WITH STEAM
STRIPPING AND ALKALINE EARTH HYDROXIDE ADDITIVE
Filed June 18, 1964
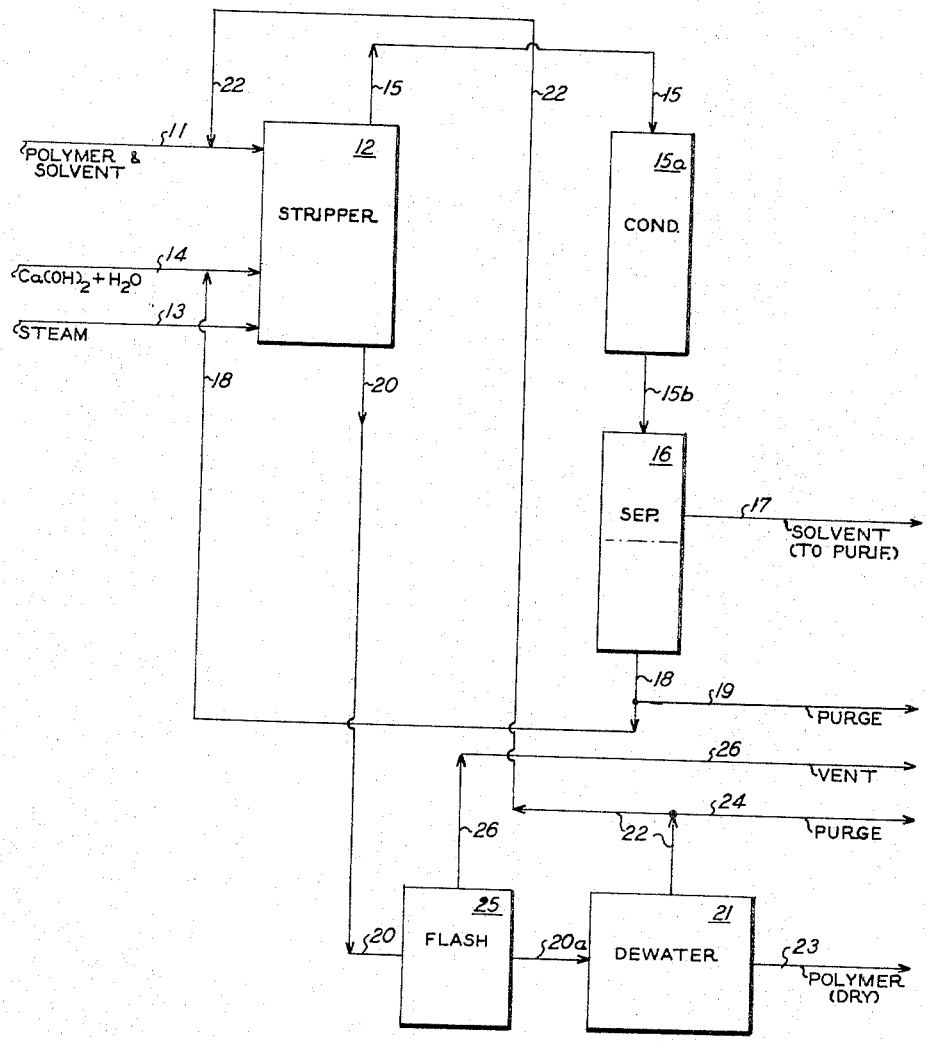
INVENTOR
JOHN WHITE COLTON
BY *William C. Long*
ATTORNEY

United States Patent Office 3,337,422
Patented Aug. 22, 1967

3,337,422
SOLVENT RECOVERY FROM POLYMERIC SOLUTION WITH STEAM STRIPPING AND ALKALINE EARTH HYDROXIDE ADDITIVE
John White Colton, 652 Timpson St.,
Pelham Manor, N.Y. 10803
Filed June 18, 1964, Ser. No. 376,160
10 Claims. (Cl. 203—36)

This invention relates to the preparation of homopolymers, copolymers and terpolymers and the like polymeric materials by processes which are characterized as "solution" polymerizations, i.e., wherein polymerization takes place in a homogeneous mixture resulting in a mixture of monomer or monomers, polymeric material, and solvent. More particularly, it relates to recovery of solvent from such a polymerization product after removal of unreacted monomers and of catalyst using a steam stripping system having a low concentration of an alkaline earth compound in the aqueous phase, to avoid agglomeration. It relates especially to such a process using a saturated aqueous calcium hydroxide solution as the aqueous phase, which solution is recovered from the polymer and recycled to the stripping step.

Numerous polymeric materials such as homopolymers, copolymers, terpolymers and the like can be made by reaction of single olefins or combinations of alpha-olefins such as ethylene, propylene, 1-butene, 1-hexene, and the like, and optionally also including one or more diolefins, such as butadiene, cyclopentadiene, and dicyclopentadiene; or dienes may be polymerized. These polymeric materials may be prepared in the presence of solvents such as n-hexane, n-heptane, n-octane, benzene, cyclohexane, carbon tetrachloride, and the like. Polymerization temperatures range from 30° to 150° C. depending on the material being polymerized and the molecular weight desired. Pressures vary from near atmospheric to 2,000 atmospheres. Polymerization takes place in the presence of metallo-alkyl compounds, such as $Al(C_6H_{13})_3$, $Al(C_6H_{13})_3$, $Al(C_2H_5)_2Cl$, $Al(iC_4H_9)_3$
$Zr(C_4H_9)_4$, $Zr(C_4H_9)_4$, $Zr(i-C_3H_7)_4$, $Ti(C_6H_{13}O)_4$ plus a soluble compound of a transition metal in Groups IV to VI of the Periodic System, e.g., $TiCl_2$, $TiCl_3$, $VCl_4$, $VOCl_3$ and the like.

After the polymerization reaction is carried to the desired extent, it is stopped in usual manner and the reaction mixture is processed to recover unreacted monomer, solvent, and then the said polymeric materials. Monomers may be evaporated or distilled off as may the solvent. After removal of the monomers, the mixture may be suspended in water and stripped with steam to leave the polymer as a crumb. The crumb may be processed in usual manner as is customary in rubber technology.

The solution of solvent and polymer after usual catalyst removal is separated by suspension of the polymer in water and steam-stripping the solvent from the heterogenous mixture. This operation is carried out in an agitated vessel and there is a tendency for the precipitated polymer particles to agglomerate and adhere to the walls of the vessel and to the agitator blades. In addition problems may arise in the subsequent dewatering of the polymer slurry, due to sticking in the filter-press, extruder, or the like. The art is confronted with the problem of providing an efficient and economical process for the recovery of these polymers without this agglomeration which requires frequent shut-down.

The discoveries associated with the invention and relating to the solution of the above problems, and the objects achieved in accordance with the invention as set forth herein include the provision of:

A process for recovering solvent from a solution therein of a polymeric material which process comprises steam stripping said solvent from said solution while the latter is suspended in an aqueous phase containing a low concentration of an alkaline earth compound, whereby agglomeration of polymeric material is avoided;
such a process wherein the aqueous phase is a substantially saturated solution of calcium hydroxide;
such a process wherein the aqueous calcium hydroxide is separated from the aqueous slurry of polymeric material and recycled to the solvent stripping step;
such a process wherein heptane is separated from a solution therein of ethylene-propylene copolymer;
such a process wherein benzene is separated from a solution therein of polybutadiene;
such a process wherein octane is separated from a solution therein of an ethylene, propylene, butene and 6-methyl-1,5 heptadiene quatropolymer;
such a process wherein perchlorethylene is separated from a solution of an ethylene, propylene and 11-ethyl-1, 11-tridecadiene terpolymer;
and other objects which will be apparent as details or embodiments of the invention set forth hereinafter.

The accompanying drawing is a schematic flow diagram of one embodiment of the invention.

Referring to the drawing, a feed mixture of solvent and polymeric material (free of monomer and of catalyst) is passed via line 11 into stripper 12, wherein it is slurried in aqueous calcium hydroxide fed via line 14 and stripped of solvent by means of steam fed via line 13. Solvent and water vapors pass via line 15 to condenser 15a wherein the vapor is condensed and the condensate is passed via line 15b to separator 16. Solvent and water form separate layers therein, and solvent is passed via line 17 to purification. Water is passed via lines 18 and 14 to stripper 12; optionally a small purge may be removed via line 19. The resulting mixture of water and polymeric material is removed from stripper 12 via line 20 to flash tank 25 wherein the pressure is let down, steam or vapor is vented via line 26, and the liquid is then passed via line 20a to dewaterer 21 for recovering polymeric material which is removed via line 23. Separated aqueous calcium hydroxide is recycled via lines 22 and 11 to stripper 12. Condensed steam is removed via purge line 24.

In order to indicate still more fully the nature of the present invention, the following examples of typical procedures are set forth in which parts and percents mean parts and percents by weights, respectively, unless otherwise indicated. It being understood that these examples are presented as illustrative only and they are not intended to limit the scope of the invention.

EXAMPLE 1

Using the above described system, n-heptane is removed from a solution of ethylene-propylene copolymer and n-heptane. The process is carried out in a saturated lime water bath, steam being introduced to strip out the n-heptane. The saturated lime water is recycled in the closed loop (line 22) at a rate of 3.0 lbs. recycle /lb. fresh polymer-solvent solution. Make-up lime consisting of .0015 lb. Ca (OH)$_2$/lb. water is fed at a rate of .003 lb. lime-water/lb. fresh polymer-heptane. There is no build-up of polymer on the stripper agitator or walls after 200 hours operation, and no sticking or clogging of the dewaterer (screw-type extruder). The total purge from lines 19 and 24 is equal to the amount of steam condensed in the system, less that vented via line 26. About ⅓ of the purge may be removed via line 19.

Comparative Example A

In a comparative run in which $Ca(OH)_2$ is not used, the stripper has to be stopped after two hours operation due to build-up of polymer on the agitator blades.

EXAMPLE 2

Following the process of Example 1, benzene is removed from a solution of polybutadiene in benzene. Again, saturated lime water is used as the stripping medium. The lime water circulates at 4 lbs. recycle lime water/lb. polybutadiene-benzene. Make up lime water consisting of 0.0015 lb. $Ca(OH)_2$ lb. water is fed to the stripper at a rate of 0.004 lb. lime water/lb. polybutadiene-benzene mixture. No polybutadiene build-up occurs after 200 hours operation on any of the surfaces in the system.

EXAMPLE 3

Following the process of Example 1, cyclohexane is removed from a solution consisting of 20% ethylene and 1-butene and dicyclopentadiene terpolymer therein. In this case, the process is carried out in a bath of magnesium hydroxide saturated water with steam used to vaporize the cyclohexane. The saturated magnesium hydroxide water consisting of 0.00090 lb. $Mg(OH)_2$/100 lb. water is fed at 0.003 lb./lb. fresh polymer-cyclohexane mixture. Terpolymer does not build up on the agitator or extruders after 200 hours operation.

EXAMPLE 4

The procedure of Example 1 is repeated except that octane solvent is removed from a solution of ethylene, propylene, t-methyl, 1,5-heptadiene and butene quatropolymer in octane. Similar results are obtained.

EXAMPLE 5

The procedure of Example 1 is repeated except that perchloroethylene solvent is removed from a solution of ethylene, propylene, and 11-ethyl-1,11-tridecadiene terpolymer in perchloroethylene. Similar results are obtained.

Comparable results are achieved with all systems of this type; i.e., known other solutions of polymeric materials in one or more volatile solvents, using an alkaline earth compound to avoid agglomeration. The invention achieves solvent removal in usual steam stripping manner with efficient crumb formation.

A low concentration of the inorganic compound is used, e.g. a saturated solution where the alkaline earth compound has a low solubility in water. Generally, the concentration of the inorganic compound or mixture of compounds may be at least 0.0004 lb./100 lbs. of water up to the saturation point or up to about 0.002 lb./lb. of water as a practical upper limit, in the system at the steam stripping temperature at atmospheric pressure. Any convenient solution feed rate may be used, provided the desired inorganic compound concentration is maintained in the solvent and water separation zones. A practical feed rate is in the range of about 0.0001 to 0.01 lb. solution/lb. fresh polymer-solvent fed to the separation zone in the stripper and in the dewatering system. Enough feed must be used to make up for losses of alkaline earth compound in the purge from the system. Generally, the purge may be about 5 to 15% of the aqueous liquid removed in the dewatering step, the remainder being recycled.

In view of the foregoing disclosures, variations and modifications thereof will be apparent to one skilled in the art, and it is intended to include within the invention all such variations and modifications except as do not come within the scope of the appended claims.

What is claimed is:

1. A process for recovering solvent from a catalyst-free solution therein of a polymeric material which process comprises steam stripping said solvent from said solution in a stripping zone while the latter is suspended in an aqueous phase, adding an alkaline earth hydroxide to the stripping zone, whereby agglomeration of polymeric material is avoided.

2. A process of claim 1 wherein the aqueous phase is a substantially saturated solution of calcium hydroxide.

3. A process of claim 2 wherein the aqueous calcium hydroxide is separated from the aqueous slurry of polymeric material, said slurry resulting from steam stripping solvent from the solution of polymeric material, and recycled to the solvent stripping step.

4. A process of claim 2 wherein heptane is separated from a solution therein of ethylene-propylene copolymer.

5. A process of claim 2 wherein benzene is separated from a solution therein of polybutadiene.

6. A process of claim 2 wherein octane is separated from a solution therein of an ethylene, propylene, butene and 6-methyl-1,5 heptadiene quatropolymer.

7. A process of claim 2 wherein perchloroethylene is separated from a solution of an ethylene, propylene and 11-ethyl-1, 11-tridecadiene terpolymer therein.

8. A process of claim 1 wherein the aqueous phase is a substantially saturated solution of magnesium hydroxide.

9. A process of claim 8 wherein the aqueous magnesium hydroxide is separated from the aqueous slurry of polymeric material, said slurry resulting from steam stripping solvent from the solution of polymeric material, and recycled to the solvent stripping step.

10. A process of claim 9 wherein cyclohexane is separated from a solution therein of an ethylene, 1-butene, and dicyclopentadiene terpolymer.

References Cited

UNITED STATES PATENTS

| | | | |
|---|---|---|---|
| 2,280,794 | 4/1942 | Cass | 203—36 |
| 2,502,485 | 4/1950 | Saunders | 203—37 |
| 2,615,010 | 10/1952 | Troyan | 203—79 X |
| 2,962,488 | 11/1960 | Horne | 260—94.7 |
| 3,247,176 | 4/1966 | Veal | 260—94.7 |

NORMAN YUDKOFF, *Primary Examiner.*

J. B. DONIHEE, *Assistant Examiner.*